(12) United States Patent
Wang et al.

(10) Patent No.: US 9,094,565 B2
(45) Date of Patent: Jul. 28, 2015

(54) IMPULSE NOISE REMOVAL DESIGN FOR BAYER PATTERN IMAGE SENSOR

(75) Inventors: Yong Wang, Beijing (CN); Bin Huo, Wayland, MA (US); Yimiao Zhao, Beijing (CN); Jianrong Chen, Andover, MA (US)

(73) Assignee: ANALOG DEVICES, INC., Norwood, MA (US)

( * ) Notice: Subject to any disclaimer, the term of this patent is extended or adjusted under 35 U.S.C. 154(b) by 277 days.

(21) Appl. No.: 13/432,804

(22) Filed: Mar. 28, 2012

(65) Prior Publication Data
US 2013/0258143 A1    Oct. 3, 2013

(51) Int. Cl.
*H04N 5/217*    (2011.01)
*H04N 9/64*    (2006.01)
*H04N 9/04*    (2006.01)

(52) U.S. Cl.
CPC .................................... *H04N 9/045* (2013.01)

(58) Field of Classification Search
CPC ..... H04N 5/361; H04N 5/3575; H04N 5/378; H04N 9/045; H04N 5/367; H04N 5/3675; H04N 5/2176; G06T 5/001
USPC .................................. 348/242, 241, 246, 247
See application file for complete search history.

(56) References Cited

U.S. PATENT DOCUMENTS 6,747,697 B1 *   6/2004   Lin et al. ........................ 348/246
7,369,165 B2 *   5/2008   Bosco et al. .................. 348/272

* cited by examiner

*Primary Examiner* — Twyler Haskins
*Assistant Examiner* — Quang Le
(74) *Attorney, Agent, or Firm* — Kenyon & Kenyon, LLP

(57) ABSTRACT

A system and method provide for an adaptive median filter with edge protection and four line buffers to remove the impulse noise for a Bayer pattern image. The system and method separates the Bayer pattern image data into different channels by color and applies the adaptive median filter to remove the impulse noise on each channel. The adaptive median filter has five threshold values that may be modified to achieve different light condition response based on the detected noise level of the image. Thus, proper threshold values with better brightness response to the input pixels may be applied and impulse noise may be suppressed effectively, while preserving image details.

20 Claims, 8 Drawing Sheets

| G  | R  | G1 | R  | G  |
|----|----|----|----|----|
| B  | G2 | B  | G3 | B  |
| G4 | R  | G0 | R  | G5 |
| B  | G6 | B  | G7 | B  |
| G  | R  | G8 | R  | G  |

| B1 | G | B2 | G | B3 |
|----|---|----|---|----|
| G  | R | G  | R | G  |
| B4 | G | B0 | G | B5 |
| G  | R | G  | R | G  |
| B6 | G | B7 | G | B8 |

Figure 3

| R1 | G | R2 | G | R3 |
|----|---|----|---|----|
| G  | B | G  | B | G  |
| R4 | G | R0 | G | R5 |
| G  | B | G  | B | G  |
| R6 | G | R7 | G | R8 |

Figure 4

| | | | | | |
|---|---|---|---|---|---|
| G | R | G0 | R | G | line0 |
| B | G | B | G | B | line1 |
| G | R | G1 | R | G | line2 |
| B | G | B | G | B | line3 |
| G | R | G2 | R | G | Current line |
| B | G | B | G | B | |
| G | R | G3 | R | G | |
| B | G | B | G | B | |
| G | R | G4 | R | G | |
| B | G | B | G | B | |
| G | R | G5 | R | G | |
| B | G | B | G | B | |
| G | R | G6 | R | G | |
| B | G | B | G | B | |
| G | R | G7 | R | G | |
| B | G | B | G | B | |
| G | R | G8 | R | G | |
| B | G | B | G | B | |
| G | R | G9 | R | G | |
| B | G | B | G | B | |

|       | | | | |       |
|-------|---|---|---|---|-------|
| B     | G | B9 | G | B     |
| G     | R | G  | R | G     |
| B     | G | B8 | G | B     |
| G     | R | G  | R | G     |
| B     | G | B7 | G | B     |
| G     | R | G  | R | G     |
| B     | G | B6 | G | B     |
| G     | R | G  | R | G     |
| B     | G | B5 | G | B     |
| G     | R | G  | R | G     |
| B     | G | B4 | G | B     |
| G     | R | G  | R | G     |
| B     | G | B3 | G | B     |
| G     | R | G  | R | G     |
| B     | G | B2 | G | B     |
| G     | R | G  | R | G     |
| B     | G | B1 | G | B     |
| G     | R | G  | R | G     |
| B     | G | B0 | G | B     | line0, line1, line2, line3, Current line

IMPULSE NOISE REMOVAL DESIGN FOR BAYER PATTERN IMAGE SENSOR

FIELD OF THE INVENTION

The present invention relates to a process for removing impulse noise from a Bayer pattern image. The present invention relates to an adaptive median filter configured to remove impulse noise from a Bayer pattern image. The present invention further relates to a process for separating Bayer pattern image data into separate channels by color and removing the impulse noise on each channel. The present invention further relates to an adaptive median filter that separates Bayer pattern image data by channel.

BACKGROUND INFORMATION

Digital still cameras and many similar CCD or CMOS sensor devices have gained significant popularity in recent years. However, the digital images that these devices take are often affected by impulse noise during their image acquisition or transmission processes. For example, impulse noise can lead to instances in which pixels of the image are dead (i.e. a pixel is always dark), hot (i.e. a pixel is always white), or hopping (i.e. a pixel flickers or stutters). These unwanted effects lead to the desire for impulse noise removal to suppress the corresponding noise while preserving the integrity of the image edge and detail information.

Traditionally, a number of methods have been used to remove impulse noise, with these methods focusing on both nonlinear removal techniques and linear removal techniques. Nonlinear removal techniques, however, have demonstrated better results in comparison with linear methods. A nonlinear removal method, such as the use of a simple median filter, has demonstrated proficiency in the removal of impulse noise. However, because nonlinear removal approaches, such as the use of a median filter, are typically implemented uniformly across an image, these approaches also tend to modify pixels that are undisturbed by noise. Consequently, the effective removal of impulses using these nonlinear removal methods is often at the expense of blurred and distorted image features.

Various techniques have been developed to perform the noise removal and also reduce the undesirable artifacts. For example, U.S. Pat. No. 7,369,165 ("'165 patent") discusses a noise filter based on Bayer pattern image with noise level computation. The filter used in the '165 patent is concentrated on a Gaussian noise type, which is not ideal for an impulse noise type. The filter in the '165 patent also requires a high allotment of memory and an implementation with a back-end processor, which ultimately leads to excessive and impractical hardware costs. U.S. Pat. No. 6,229,578 ("'578 patent"), which implements a noise-removal algorithm, is similarly not suitable for software implementation because of the required complex calculation and high memory cost. The '578 patent invention also uses a filter that has threshold values that are not adaptively generated, which also limits its usage in different light conditions.

Since the existing techniques involve complex hardware structures and do not reduce the undesirable artifacts effectively, there is a need to develop a novel method to reduce complexity of hardware structures and reduce undesirable artifacts. There also remains a need for a system and method for impulse noise removal to be adaptive to different applications and light conditions.

SUMMARY OF THE INVENTION

A system and method are described herein that provide for an integrated circuit having an adaptive median filter with edge protection and four line buffers to remove the impulse noise for a Bayer pattern image. The system and method separates the Bayer pattern image data into different channels by color and applies the adaptive median filter to remove the impulse noise on each channel. The adaptive median filter has five threshold values that may be modified to achieve different light condition response based on the detected noise level of the image. Thus, proper threshold values with better brightness response to the input pixels may be applied and suppresses impulse noise effectively, while preserving image details.

In particular, the exemplary embodiments and/or exemplary methods of the present invention are directed to a system and a method for removing impulse noise from a Bayer pattern image. The system and method includes the steps of inputting the Bayer pattern image into a memory interface of an integrated circuit and identifying a color of an operating pixel. After the color of the operating pixel has been identified, a filter window may be applied to the operating pixel. Subsequently, a maximum value of the operating pixel and neighbor pixels on different channels of the integrated circuit can be determined and used to generate a scale factor.

The system and method also includes the generation of five filter threshold values for an adaptive median filter on each of the noise removal channels units. Identification can be made with the adaptive median filter as to whether the operating pixel is impulse noise, and if it is, the operating pixel can be replaced with an output of the adaptive median filter if the operating pixel is unsuitable for image detail.

BRIEF DESCRIPTION OF THE DRAWINGS

FIG. 3 is a diagram of a B window according to an embodiment of the present invention.

FIG. 4 is a diagram of an R window according to an embodiment of the present invention.

FIG. 6 is a diagram of a G channel filter window according to an embodiment of the present invention.

FIG. 7 is a diagram of a B channel filter window according to an embodiment of the present invention.

DETAILED DESCRIPTION

The subject invention will now be described in detail for specific preferred embodiments of the invention, it being understood that these embodiments are intended only as illustrative examples and the invention is not to be limited thereto.

Previous implementations for removing noise from Bayer pattern images have focused on the removal of Gaussian noise or the use of non-adaptive median filters. A system and method with an adaptive median filter may be used to remove impulse noise from a Bayer pattern image. The adaptive median filter may have edge preservation properties to preserve the edges of the pattern image, and may use four line buffers to remove the impulse noise for a Bayer pattern image. Bayer pattern image data may be separated into different channels by color and the adaptive median filter may be applied to remove the impulse noise on each channel. The adaptive median filter may have five threshold values that may be modified to achieve a different light condition response based on the detected noise level of the image. These five threshold values may correspond to advantageously better brightness response to the input pixels, and the impulse noise may be effectively suppressed while preserving image details of the Bayer pattern image.

Figures 1, 2:
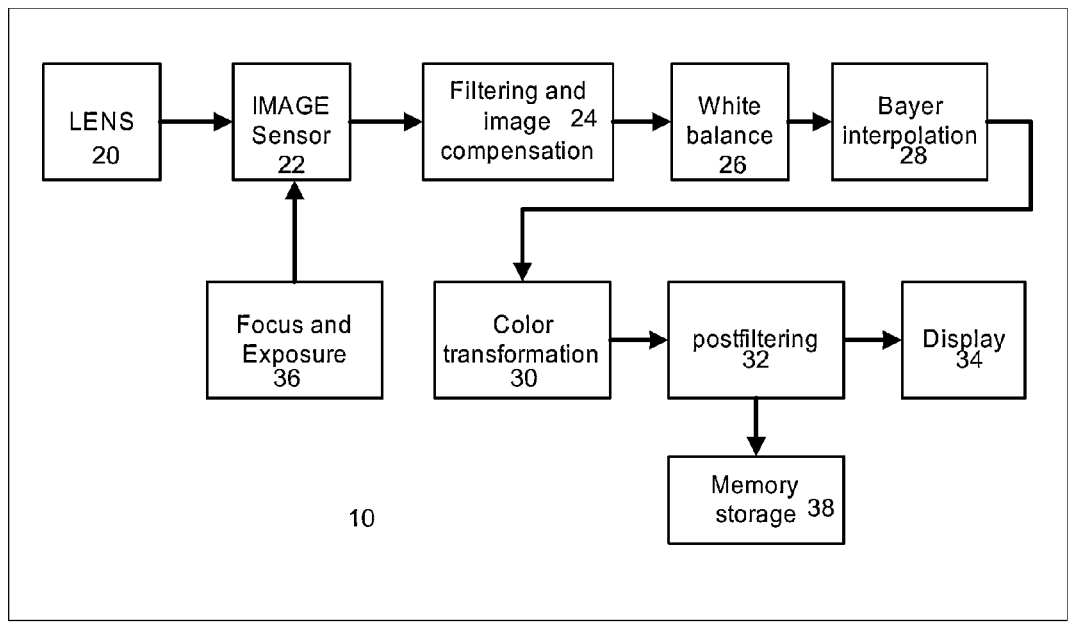
FIG. 1 is a diagram of a typical digital camera signal processing flow.
FIG. 2 is a diagram of a G window according to an embodiment of the present invention.

FIG. 1 illustrates a typical digital camera signal processing flow of a digital camera system 10. The digital camera system 10 may include an optical lens 20 and an image sensor 22 which outputs a Bayer pattern image. The image sensor 22 may be coupled with a focus and exposure unit 36 that adjusts the settings of the image during acquisition. The digital camera system 10 may also include a filtering and image compensation unit 24 which receives the Bayer pattern image and a white balance unit 26 which adjusts the neutrality of the colors in the Bayer pattern image. Digital camera system 10 may also include a Bayer interpolation unit 28 which transforms the Bayer pattern image to a RGB image using red, blue, and green channels. Digital camera system 10 may also include a color transformation unit 30 and a post filtering unit 32. The digital camera system 10 may also include a display 34 for displaying the image or a memory 38 for storing the image.

Three 3×3 filter windows may be adopted the red, green, and blue channels. FIG. 2 illustrates a 3×3 filter window for G pixels on the green channel. In an example embodiment, a filter window for the green channel may be selected to be diamond-shaped. In this example embodiment, the pixel G0 may be selected to be the operating pixel. In this example embodiment, pixels G1, G2, G3, G4, G5, G6, G7, and G8 may neighbor the operating pixel. Pixels G2, G3, G6, and G7 may be selected because they are closer in proximity to the operating pixel, G0.

FIG. 3 illustrates a 3×3 filter window for B pixels on the blue channel. In an embodiment, a filter window for the blue channel may be selected to be square-shaped. In this example embodiment, the pixel B0 may be selected to be the operating pixel. In this example embodiment, pixels B1, B2, B3, B4, B5, B6, B7, and B8 may neighbor the operating pixel.

FIG. 4 illustrates a 3×3 filter window for R pixels on the red channel. In an embodiment, a filter window for the red channel may also be selected to be square-shaped, similar to the B pixel filter window shown in FIG. 3. In this example embodiment, the pixel R0 may be selected to be the operating pixel. Pixels R1, R2, R3, R4, R5, R6, R7, and R8 may neighbor the operating pixel.

In an embodiment, the filter windows for the B pixels and the R pixels may both be square-shaped. In this embodiment, the same filter window may be used. The use of the same, or similar shaped, 3×3 filter windows, may allow for a simplification in the hardware design and calculation of each of the channels. Each of the green, blue, and red channels may be simplified to a single operating pixel (Y0) and eight neighbor pixels (Y1-Y8).

Figure 5:
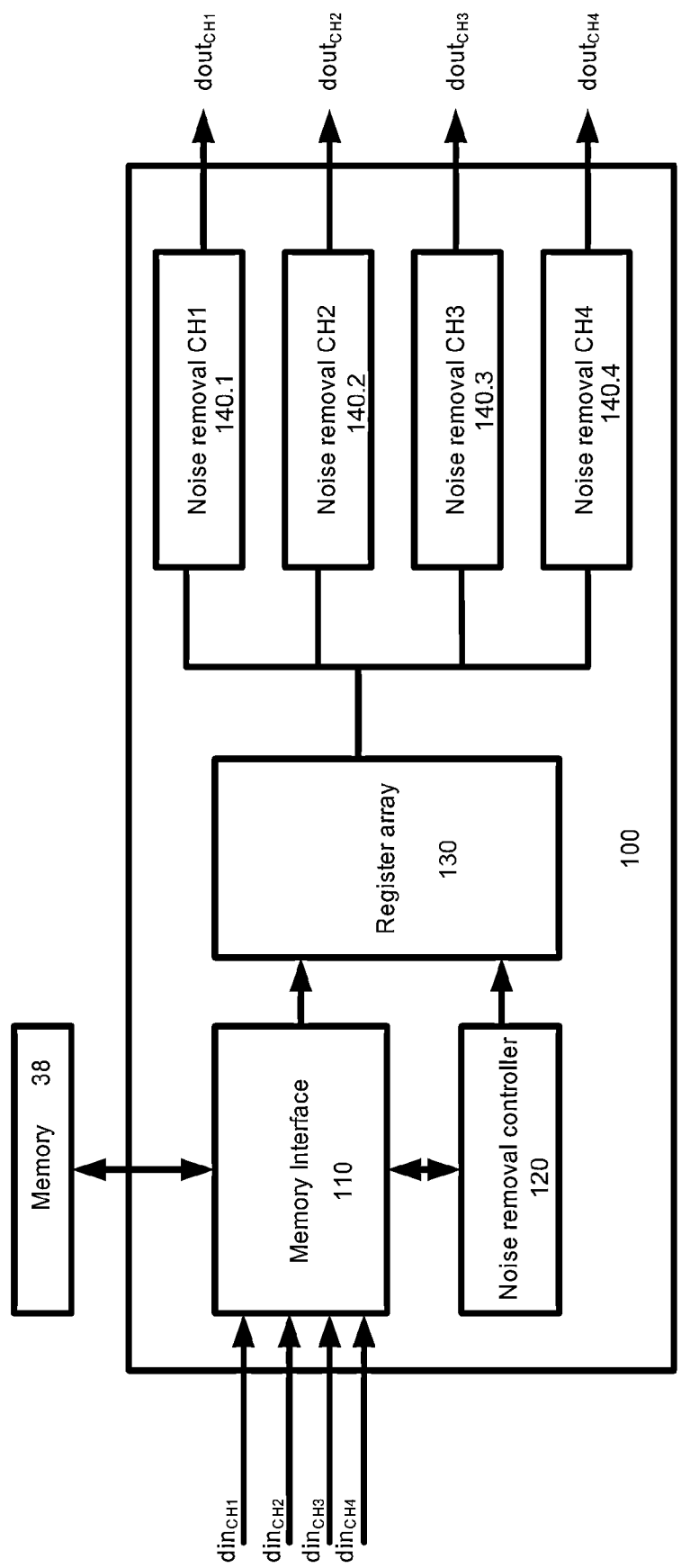
FIG. 5 is a system diagram of a multi-channel parallel noise removal circuit for high speed application according to an embodiment of the present invention.

FIG. 5 illustrates a multi-channel parallel noise removal circuit 100 connected to memory storage 38. Noise removal circuit 100 may be configured for use with a high-speed readout CCD or CMOS sensor. In the embodiment illustrated in FIG. 5, noise removal circuit 100 may accommodate 4 separate channels. Noise removal circuit 100 may include a memory interface 110 that may receive input data on 4 separate channels. The inputs on CH1, $din_{CH1}$, and CH2, $din_{CH2}$, may correspond to green pixels. The inputs on channels 3 and 4 ($din_{CH3}$ and $din_{CH4}$) may correspond to red or blue pixels. Memory interface 110 may be directly connected to memory storage 38.

Memory interface 110 may also be connected to noise removal controller 120 and to register array 130. Noise removal controller 120 may also be connected directly to register array 130. Register array 130 may output data corresponding to the four different channels, to the array of noise removal channel units 140.1-140.4. Noise removal channel unit 140.1 may correspond to CH1, and may output data, $dout_{CH1}$, corresponding to the same CH1. Noise removal channel unit 140.2 may correspond to CH2, and may output data, $dout_{CH2}$, corresponding to CH2. Noise removal channel unit 140.3 may correspond to CH3, and may output data, $dout_{CH3}$, corresponding to CH3. Noise removal channel unit 140.4 may correspond to CH4, and may output data, $dout_{CH4}$, corresponding to CH4. Each of the noise removal channel units 140.1-140.4 may be directly connected to register array 130.

Memory interface 110 may receive the four channel inputs $din_{CH1}$, $din_{CH2}$, $din_{CH3}$, and $din_{CH4}$, and may reorder the input data so that $din_{CH1}$ and $din_{CH2}$ correspond to green pixels and $din_{CH3}$ and $din_{CH4}$ correspond to red or blue pixels. Memory interface 110 may also store the received input pixels into different line memories of the memory interface. In this embodiment, memory interface 110 may perform a modulation on the line counter and the number of channels, and store this result in memory interface 110.

Noise removal circuit 100 may also include noise removal controller 120. Noise removal controller 120 may provide various controller signals for the noise removal circuit to selectively control the memory interface 110 and the register array 130. These controller signals may include the image width and height or the flagging of a valid or invalid pixel. Noise removal controller 120 may also adaptively calculate the threshold values for adaptive filters in the noise removal channel units 140.1-140.4.

Register array 130 may select the filter window pixels for each of the noise removal channel units 140.1-140.4 in the noise removal channel array. Register array 130 may be configured to select different pixels for the green channels and red or blue channels. FIG. 6 illustrates an example embodiment of the selection of a G channel filter window. The designation of "line0-line3" may designate the four distinct line memories that are stored in memory storage 38 and memory interface 110.

In an example embodiment, pixel G2 may be selected as the initial operating pixel (Y0) on CH1, and the filter window may be selected to be diamond-shaped. There may be 8 neighboring pixels to pixel G2 on CH1. On CH2, pixel G3 may be selected as the initial operating pixel (Y0) and the filter window may also be diamond-shaped. There may also be 8 neighboring pixels to pixel G3 on CH2. In this embodiment, the "Current line" may correspond to line2.

FIG. 7 illustrates an example embodiment of the selection of a B channel filter window. Similar to FIG. 6, the designation of "line0-line3" may designate the four distinct line memories that are stored in memory storage 38 and memory interface 110, where as the designation of "Current line" may simply refer to the line in which the filter window is operating on (i.e. the line in which the current operating pixel is on). Although FIG. 7 illustrates the selection of a blue channel window, the same implementation may be done for selection of an R channel filter window. In an example embodiment, pixel B2 may be selected as the initial operating pixel (Y0) on CH3, and the filter window may be selected to be square-shaped. There may be 8 neighboring pixels to pixel B2 on CH3. On CH4, pixel B3 may be selected as the initial operating pixel (Y0) and the filter window may also be square-shaped. There may also be 8 neighboring pixels to pixel B3 on CH4.

In both the implementations of FIG. 6 and FIG. 7, processing of the pixels may be performed in the same manner. The designated filter window may start on an initial operating pixel (In FIG. 6, G2 on CH1 and G3 on CH2, and in FIG. 7, B2 on CH3, and B3 on CH4) on a designated line. The designated filter window may process an operating pixel and its neighboring pixels. The designated filter window may then move from left to right to a subsequent pixel. This subsequent pixel may be selected as the operating pixel, and it, as well as its neighboring pixels, may be processed. The designated filter window may move from left to right until all pixels in a particular line are processed in a similar fashion. The designated filter window may then move onto the next line for the processing of the remaining pixels in the same manner. The selection and processing of the pixels may be done in register array 130.

When each selection of an operating pixel is made by a filter window on a particular channel by register array 130, the operating pixel (Y0) and its 8 neighbor pixels may be selectively sent to the noise removal array 140.1-140.4. The noise removal channel units 140.1-140.4 may collectively use the selected 3×3 window, an adaptive median filter, and noise level corresponding to the pixels, to determine whether the operating pixel is a bad pixel. If a determination is made that an operating pixel is a bad pixel, the corresponding noise removal channel unit 140.1-140.4 in the noise removal array may determine how to replace the bad pixel.

Figure 8:
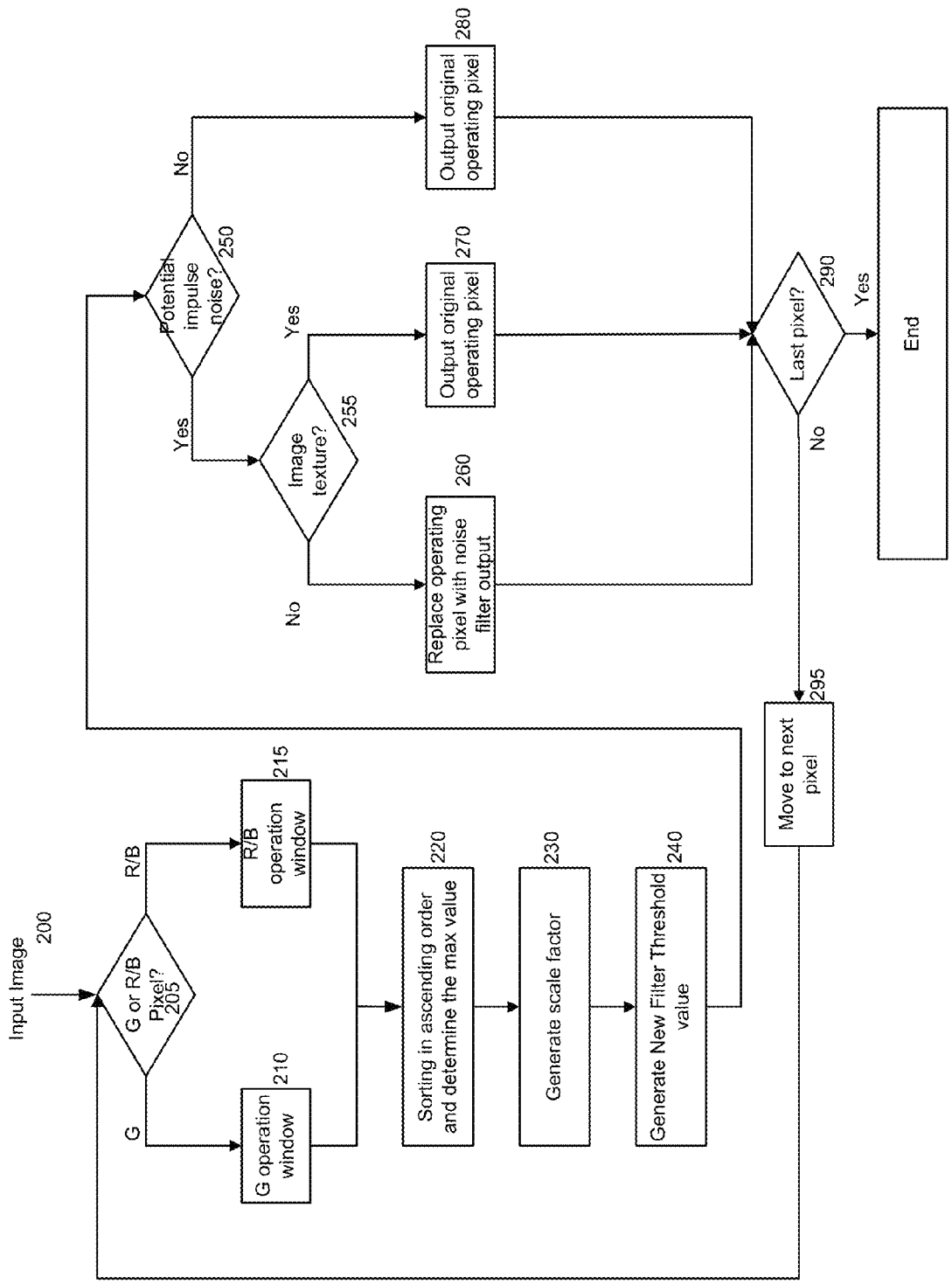
FIG. 8 is a diagram of the process of the impulse noise removal flow according to an embodiment of the present invention.

The input image in the Bayer pattern format may be scanned sequentially row by row, beginning on the top row, from left to right. FIG. 8 illustrates a flow diagram of the adaptive impulse noise removal process. In step 200, the inputted Bayer pattern image may be input to the adaptive median filter(s) of the noise removal channel units 140.1-140.4. In step 205, a determination may be made as to the color of the operating pixel, Y0, of an inputted window. If the adaptive median filter determines that the operating pixel is green, the system may move to step 210. If the adaptive median filter determines that the operating pixel is not green, the system may move to step 215. The system may move to step 215 if the operating pixel is determined not to be green, regardless of whether it is red or blue. If the system determines that the operating pixel is green, it may configure a green filter window, as illustrated in FIG. 2, in step 210. If the system determines that the operating pixel is red or blue, in step 215, a red or blue filter window may be configured, as shown in FIGS. 3 and 4. In an embodiment, the red and the blue filter windows may be the same.

Figure 9:
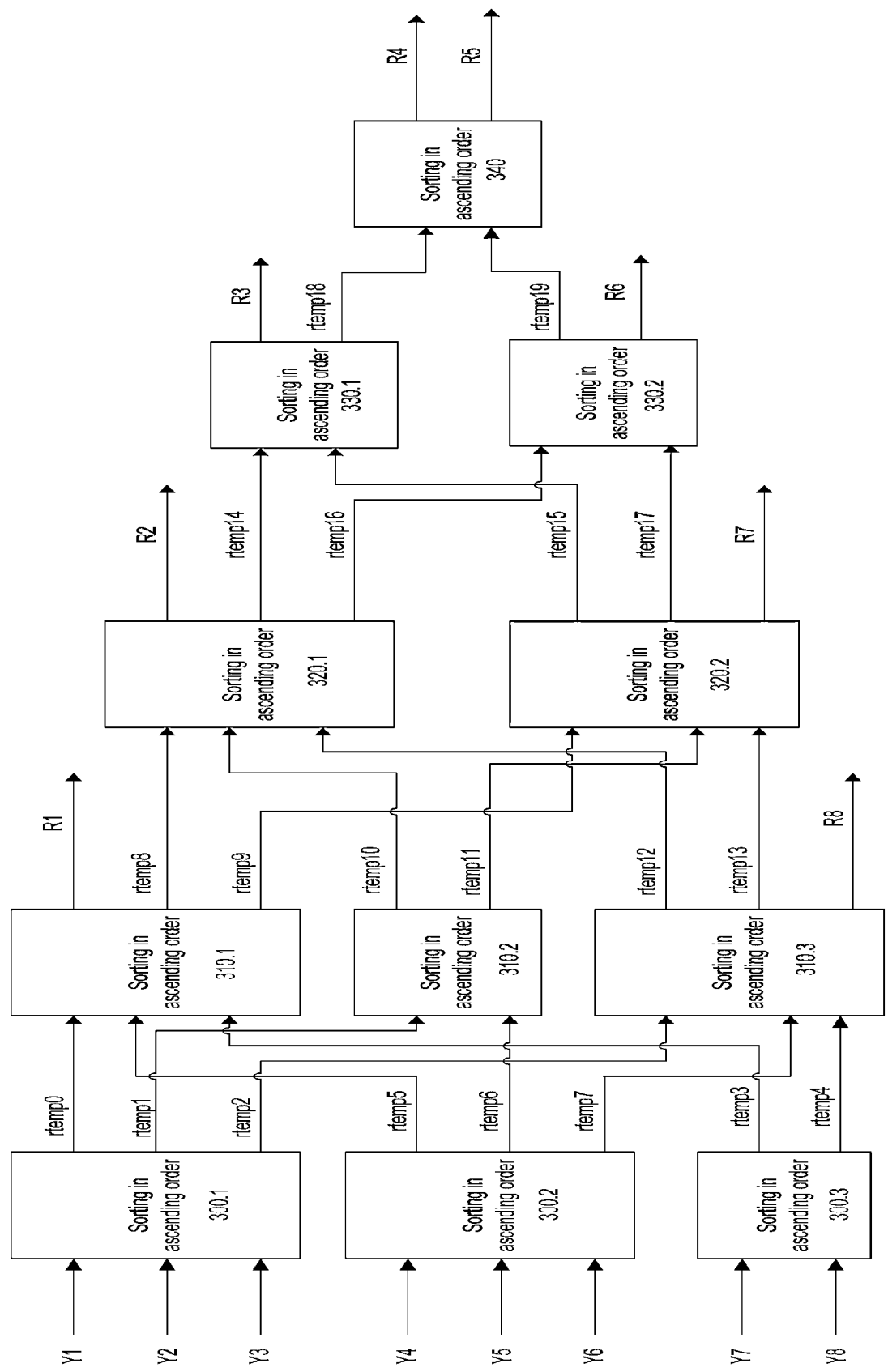
FIG. 9 is a diagram of an eight neighbor pixel sorting block according to an embodiment of the present invention.

After the filter window has been selected in steps 210 or 215 and the encompassed nine pixels are prepared, a sorting calculation may be made for the 8 neighbor pixels (Y1-Y8) in step 220. These neighbor pixels may be sorted in ascending order. An example embodiment of an architecture for sorting the neighbor pixels is illustrated in FIG. 9. As illustrated in FIG. 9, the 8 neighbor pixels (Y1-Y8) may be sorted in a plurality of sorting blocks (such as a comparator or similar logic). In an example embodiment, 2-3 neighbor pixels may be compared in a sorting block 300.1-300.3. After being sorted in sorting blocks 300.1-300.3, the results may be output to sorting blocks 310.1-310.3 based on order of the results. The pixel having the highest data value in each of sorting blocks 300.1-300.3 may be output to sorting block 310.3 for further sorting. Conversely, the pixel having the lowest data value in each of sorting blocks 300.1-300.3 may be output to sorting block 310.1 for further sorting. Pixels in sorting block 300.1 and 300.2 having median data values may be output to sorting block 310.2.

This process may be repeated through sorting blocks 310.1-310.3, sorting blocks 320.1-320.2, sorting blocks 330.1-330.2, and sorting block 340 until all of the neighbor pixels have been sorted in ascending order. After the sorting calculation may be performed by the sorting blocks, Y1-Y8 may be reordered as R1-R8 (R1<R2<R3<R4<R5<R6<R7<R8) in ascending order. The median value of the reordered 8 pixels may be determined by Equation (i):

$$M(n) = \frac{R4 + R5}{2}. \qquad (i)$$

Sorting of the neighbor pixels and calculating a maximum value may be done for each window on each of the four channels, CH1-CH4, in step 220. Each of the maximum values (Dmax) may be used to calculate a scale factor in step 230. Each of the maximum values of the four channels may be sent to a generating scale factor block, such as a comparator, which may be used to determine the highest value Dmax. This value, Tmax, may correspond to a final maximum value.

In an example embodiment, where the Bayer pattern image is from a digital camera, the input pixel value may vary from very small or negative values to acceptable value ranges. The input pixel values having small or negative areas may correspond to dark areas of the Bayer pattern image. The value of Tmax for each pixel may be used to replace the dark areas in the pattern image and to calculate the scale factor, however, simply using Tmax to replace a pixel may not be desirable because of the possible misdetection in the values of each pixel due to the presence of impulse noise. It may be desirable to determine threshold values for acceptable impulse noise, and use the determined threshold values to allocate any adjustment made to the Tmax value for the designated pixel. Two threshold values, dnoiseth1 and dnoiseth2, may be initially set to determine a final maximum value. The threshold value dnoiseth1 may be set at 0.0001 and dnoiseth2 may be set at 0.05. The final maximum value for a pixel may be determined by Equation (ii) in step 220:

$$Finalmaxvalue = \begin{cases} dnoiseth1 * 2 & \text{if } Tmax < dnoise_{th1} \\ Tmax * 2 & \text{if } dnoiseth1 \leq Tmax < dnoiseth2 \\ Tmax & \text{if } Tmax \geq dnoiseth2. \end{cases} \qquad (ii)$$

Figure 10:
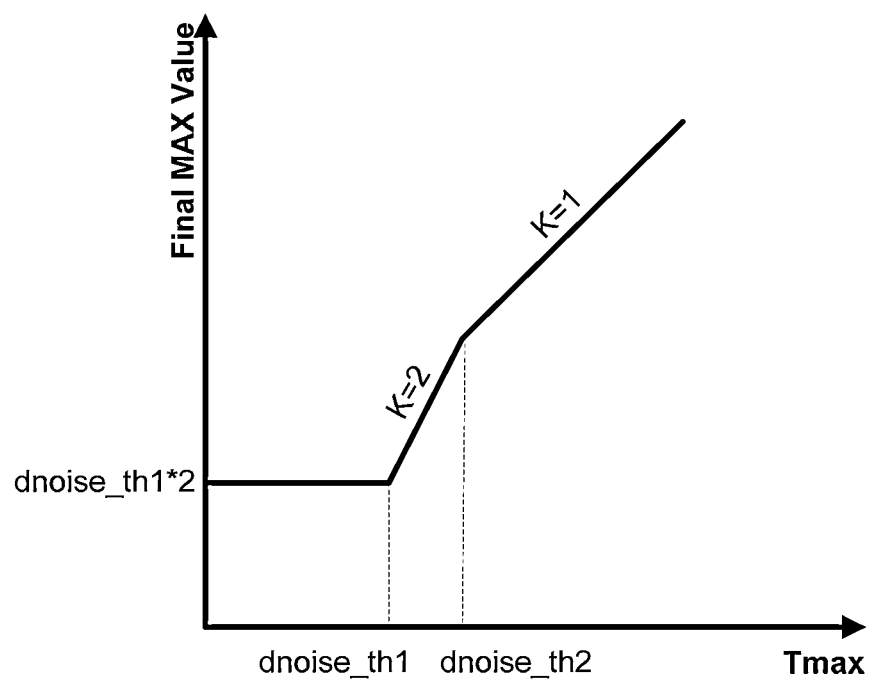
FIG. 10 is a graph of the maximum value adjustment curve according to an embodiment of the present invention.

FIG. 10 illustrate a maximum adjust curve reflecting the final max value as determined in Equation(ii). After Equation (ii) is used to calculate the final max value, the adaptive threshold scale factor may be determined by Equation (iii) in step 230:

scale factor=local final max value/image max value (iii).

Once the scale factor is generated in step 230, new threshold values, may be calculated in accordance to the scale factor in step 240. In an embodiment, there may be five determined default threshold values for the adaptive median filter, T1, T2, T3, T4, and T5. The threshold values T1, T2, T3, and T4 may be used for the adaptive median filter of noise removal channel units 140.1-140.4 to determine if a particular operating pixel is impulse noise, with T1<T2<T3<T4. The threshold value T5 may be used as to protect the image detail of the Bayer pattern image. New threshold values may be determined for T1-T5 by scaling by the scale factor in Equation (iv):

$$\begin{cases} \text{New } T1 = \text{scale factor} * T1 \\ \text{New } T2 = \text{scale factor} * T2 \\ \text{New } T3 = \text{scale factor} * T3 \\ \text{New } T4 = \text{scale factor} * T4 \\ \text{New } T5 = \text{scale factor} * T5, \end{cases} \quad (iv)$$

where T1 may be initially set at 0.03, T2 may be initially set at 0.078, T3 may be initially set at 0.156, T4 may be initially set at 0.195, and T5 may be initially set at 0.125.

After the threshold values have been calculated, the adaptive median filter may compare the reordered neighbor pixels to the operating pixel, Y0, in step 250, to determine if the operating pixel is impulse noise. If R(n) equals the set of neighbor pixels R1-R8 in ascending order, the differences between the neighbor pixels and the operating pixel may be reflected by Equation (v):

$$d_k(n) = \begin{cases} R_k(n) - Y0, & Y0 \leq M(n) \\ Y0 - R_{9-k}(n), & Y0 > M(n) \end{cases} \quad k = 1, 2, 3, 4. \quad (v)$$

For k=1, 2, 3, 4, since R(n) may be ordered ascending, the resulting differences between the operating pixel and the neighbor pixels may also be ordered ascending, and $d_1(n) < d_2(n) < d_3(n) < d_4(n)$. The resulting differences may provide an indication as to whether the operating pixel is impulse noise in step 250. In an embodiment where $d_1(n)$ is positive and has a small value, the current operating pixel, Y0, may be determined to be either the smallest or the largest value in the current filter window. In an embodiment where $d_1(n)$ is positive and has a large value, the operating pixel may be determined to be impulse noise. Collectively, $d_1(n)$, $d_2(n)$, $d_3(n)$, and $d_4(n)$ may provide more information about the presence of an impulse noise pixel. Each of the determined differences may be compared to the determined to the new threshold values. In an embodiment, $d_1(n)$ may be compared with New $T_1$, $d_2(n)$ may be compared with New $T_2$, $d_3(n)$ may be compared with New $T_3$, and $d_4(n)$ may be compared with New $T_4$. If any of the determined differences ($d_1(n)$–$d_4(n)$) are greater than the corresponding threshold value, then the operating pixel may be determined as potential impulse noise and the system may move to step 255. If none of the determined differences ($d_1(n)$–$d_4(n)$) are greater than the corresponding threshold value, the operating pixel may be treated as a good pixel and output by noise removal circuit 100 in step 280.

The adaptive median filter may in some scenarios, for example with thin line pixels, mistakenly identify a pixel as impulse noise when it is not. Threshold value T5 may be introduced to detect the image detail information and determine that a pixel has not been mistakenly identified as impulse noise in step 255. In an embodiment, the distance between the operating pixel, Y0, and each of its 8 neighbor pixels may be calculated. The differences between the value of the operating pixel and the values of its 8 neighbor pixels may also be calculated, according to Equation (v), and may be compared with threshold value New T5. If two or more of the calculated differences are less than the threshold value New T5, it may be determined that at least two neighbor pixels are closer to the operating pixel than the threshold value New T5, and Y0 is a suitable pixel for image detail to be output in step 270, and a flag signal may be set to high. If one or none of the calculated differences are less than the threshold value New T5, it may be determined that Y0 is impulse noise, and may be replaced by the filter output, M(n), in step 260. If Y0 is determined to be impulse noise a flag signal may be set to low.

The final output of operating pixel Y0 may be reflected by the function (vi):

```
if (d1(n) > T1 OR d2(n) > T2 OR d3(n) > T3 Or d4(n) > T4)
    if (flag is high)
        new Y0 = Y0;
    else
        new Y0 = M(n);
else
    new Y0 = Y0;                                    (vi).
```

In step 290, the system may determine whether the operating pixel is the last pixel in the Bayer pattern image. If the current operating pixel is the last pixel, the impulse noise remove process may be concluded. If the current operating pixel is not the last pixel, the filter window may move to the next pixel in step 295.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A method for removing impulse noise from a Bayer pattern image, the method comprising:
   inputting the Bayer pattern image into a memory interface of an integrated circuit;
   identifying a color of an operating pixel;
   applying a filter window based on the identified color of the operating pixel;
   determining a maximum individual value of the operating pixel and neighbor pixels on different channels of the integrated circuit;
   generating a scale factor from the maximum individual value of the operating pixel and the neighbor pixels;
   generating filter threshold values for an adaptive median filter;
   identifying, with the adaptive median filter, if the operating pixel contains impulse noise; and
   replacing the value of the operating pixel with an output of the adaptive median filter if the operating pixel is identified to contain impulse noise and unsuitable for image detail.

2. The method according to claim 1, further comprising: separating the Bayer pattern image into the different channels by color.

3. The method according to claim 1, wherein the operating pixel is identified as unsuitable for image detail if less than two of the neighbor pixels are closer to the operating pixel than a designated filter threshold value.

4. The method according to claim 1, wherein the operating pixel is not replaced if the operating pixel does not contain impulse noise.

5. The method according to claim 4, wherein the operating pixel is output by the integrated circuit.

6. The method according to claim 1, wherein the operating pixel is not replaced if the operating pixel is suitable for image detail.

7. The method according to claim 6, wherein the operating pixel is output by the integrated circuit.

8. The method according to claim 1, wherein the scale factor is a quotient of the maximum individual value and a maximum value for the Bayer pattern image.

9. The method according to claim 1, further comprising: moving the filter window to a subsequent pixel in the Bayer pattern image if other pixels remain.

10. The method according to claim 1, wherein the output of the adaptive median filter is a median value of the neighbor pixels.

11. An integrated circuit for removing impulse noise from a Bayer pattern image, the integrated circuit comprising:
   a memory interface separating the Bayer pattern image into different channels;
   a register array for storing input pixel data; and an array of noise removal channel units configure to:
      apply a filter window based on an identified color of an operating pixel;
      determine a maximum individual value of the operating pixel and neighbor pixels on the different channels;
      generate a scale factor from the maximum individual value of the operating pixel and the neighbor pixels;
      generate filter threshold values;
      identify if the operating pixel contains impulse noise; and
      replace the value of the operating pixel with a filter output if the operating pixel is identified to contain impulse noise and unsuitable for image detail;
   wherein each of the noise removal channel units includes an adaptive median filter.

12. The integrated circuit according to claim 11, further comprising: a noise removal controller selectively controlling the memory interface and the register array.

13. The integrated circuit according to claim 11, wherein the operating pixel is identified as unsuitable for image detail if less than two of the neighbor pixels are closer to the operating pixel than a designated filter threshold value.

14. The integrated circuit according to claim 11, wherein the operating pixel is not replaced if the operating pixel does not contain impulse noise.

15. The integrated circuit according to claim 14, wherein the operating pixel is output.

16. The integrated circuit according to claim 11, wherein the operating pixel is not replaced if the operating pixel is suitable for image detail.

17. The integrated circuit according to claim 16, wherein the operating pixel is output by the integrated circuit.

18. The integrated circuit according to claim 11, wherein the scale factor is a quotient of the maximum individual value and a maximum value for the Bayer pattern image.

19. The integrated circuit according to claim 11, wherein the filter window is moved to a subsequent pixel in the Bayer pattern image if other pixels remain.

20. The integrated circuit according to claim 11, wherein the output of the adaptive median filter is a median value of the neighbor pixels.

\* \* \* \* \*